(12) United States Patent
Tanno

(10) Patent No.: US 8,997,806 B2
(45) Date of Patent: Apr. 7, 2015

(54) TIRE NOISE REDUCTION DEVICE

(75) Inventor: Atsushi Tanno, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 441 days.

(21) Appl. No.: 12/433,975

(22) Filed: May 1, 2009

(65) Prior Publication Data

US 2009/0314403 A1 Dec. 24, 2009

(30) Foreign Application Priority Data

Jun. 20, 2008 (JP) ................................. 2008-162291

(51) Int. Cl.
*B60C 5/00* (2006.01)
*B60C 19/00* (2006.01)

(52) U.S. Cl.
CPC .................................... *B60C 19/002* (2013.01)

(58) Field of Classification Search
USPC .................... 152/155, 157, 158, 450
See application file for complete search history.

(56) References Cited

U.S. PATENT DOCUMENTS

| 2,040,645 | A | 5/1936 | Dickinson |
| 4,031,940 | A | 6/1977 | Bartley et al. |
| 4,096,898 | A | 6/1978 | Messerly et al. |
| 4,216,812 | A | 8/1980 | Bourne |
| 4,287,930 | A | 9/1981 | McIntosh et al. |
| 4,340,104 | A | 7/1982 | Kuan |
| 4,681,147 | A | 7/1987 | Hugele |
| 5,658,987 | A | 8/1997 | Nakamura et al. |
| 6,217,683 | B1 | 4/2001 | Balzer et al. |
| 6,538,066 | B2 | 3/2003 | Watanabe et al. |
| 6,726,289 | B2 * | 4/2004 | Yukawa et al. ............... 301/6.91 |
| 7,455,092 | B2 | 11/2008 | Yukawa et al. |
| 7,490,644 | B2 | 2/2009 | Yukawa |
| 7,677,286 | B2 | 3/2010 | Tanno |
| 2003/0111156 | A1 | 6/2003 | McNichols et al. |
| 2005/0046978 | A1 | 3/2005 | Schofield et al. |
| 2005/0205183 | A1 | 9/2005 | Yukawa |
| 2005/0247391 | A1 | 11/2005 | Ikuta |
| 2005/0275277 | A1 * | 12/2005 | Yukawa ......................... 301/6.91 |
| 2006/0108042 | A1 * | 5/2006 | Yukawa et al. ................ 152/450 |
| 2007/0199636 | A1 | 8/2007 | Tanno |
| 2009/0199942 | A1 * | 8/2009 | Tanno ............................ 152/157 |

(Continued)

FOREIGN PATENT DOCUMENTS

| DE | 198 06 935 | 9/1999 |
| GB | 1 359 468 | 7/1974 |

(Continued)

OTHER PUBLICATIONS

Office action issued in U.S. Appl. No. 12/422,548, dated May 6, 2011.

(Continued)

*Primary Examiner* — Justin Fischer
*Assistant Examiner* — Philip N Schwartz
(74) *Attorney, Agent, or Firm* — Greer Burns & Crain, Ltd.

(57) ABSTRACT

Provided is a tire noise reduction device including an annular noise absorbing member which is made of a porous material, and which is arranged on the inner circumferential surface of a tire. A protective layer made of a thermoplastic elastomer composition obtained by dispersing an elastomer in a thermoplastic resin is arranged on the outer circumferential surface of the annular noise absorbing member.

17 Claims, 3 Drawing Sheets

(56) References Cited

U.S. PATENT DOCUMENTS

| | | | |
|---|---|---|---|
| 2009/0242094 A1* | 10/2009 | Kato et al. | ............... 152/565 |
| 2009/0314402 A1 | 12/2009 | Kuramori et al. | |
| 2009/0314403 A1 | 12/2009 | Tanno | |
| 2009/0320980 A1 | 12/2009 | Tanno | |
| 2010/0032073 A1 | 2/2010 | Tanno et al. | |

FOREIGN PATENT DOCUMENTS

| | | | |
|---|---|---|---|
| JP | 62-216803 | 9/1987 | |
| JP | 1-078902 | 3/1989 | |
| JP | 64-078902 | 3/1989 | |
| JP | 4-159101 | 6/1992 | |
| JP | 6-106903 | 4/1994 | |
| JP | 8-217923 | 8/1996 | |
| JP | 9-086112 | 3/1997 | |
| JP | 2001-113902 | 4/2001 | |
| JP | 2003-063208 | 3/2003 | |
| JP | 2003-226104 | 8/2003 | |
| JP | 2004-042822 | 2/2004 | |
| JP | A 2004-291855 | 10/2004 | |
| JP | 2005-205935 | 8/2005 | |
| JP | 2005-238888 | 9/2005 | |
| JP | 2005-262921 | 9/2005 | |
| JP | 2005-297836 | 10/2005 | |
| JP | 2006-044503 | 2/2006 | |
| JP | 2006-306285 | 11/2006 | |
| WO | WO 03/103989 | 12/2003 | |
| WO | 2005/012008 | 2/2005 | |
| WO | 2006/118200 | 11/2006 | |
| WO | 2006/118202 | 11/2006 | |
| WO | WO 2006118198 A1 * | 11/2006 | ............... B60C 5/00 |
| WO | WO 2007141973 A1 * | 12/2007 | ............... B60C 5/14 |

OTHER PUBLICATIONS

Office action issued in U.S. Appl. No. 12/422,548, dated Mar. 9, 2012.
Office action issued in U.S. Appl. No. 12/919,184 dated Oct. 27, 2011.
Office action issued in U.S. Appl. No. 12/919,113 dated Mar. 6, 2012.
Office action issued in U.S. Appl. No. 12/919,183 dated Jan. 4, 2012.
Office action issued in U.S. Appl. No. 12/919,184 dated Jan. 6, 2012.
Office action issued in U.S. Appl. No. 12/919,113 dated Jul. 26, 2011.
Office action U.S. Appl. No. 12/919,184 dated Oct. 27, 2011.
Office action issued in U.S. Appl. No. 12/919,183 dated Oct. 27, 2011.
English machine translation of JP 2004-291855, dated Oct. 21, 2004.
U.S. Appl. No. 12/433,975 filed May 1, 2009.
Office action issued in U.S. Appl. No. 11/886,708 dated Sep. 18, 2007.
Office action issued in U.S. Appl. No. 12/422,548 dated Apr. 13, 2009.
Office action issued in U.S. Appl. No. 11/919,183 dated Sep. 8, 2009.
Office action issued in U.S. Appl. No. 11/919,184 dated Oct. 12, 2009.
Office action issued in U.S. Appl. No. 13/711,121 dated Dec. 11, 2012.
Office action issued in U.S. Appl. No. 13/711,171 dated Dec. 11, 2012.
U.S. Appl. No. 12/422,548 filed Apr. 13, 2009.
U.S. Appl. No. 11/919,183 filed Sep. 8, 2009.
U.S. Appl. No. 11/919,184 filed Oct. 12, 2009.
U.S. Appl. No. 11/919,113 filed Jan. 15, 2009.
Office Action issued in U.S. Appl. No. 12/422,548 dated Oct. 13, 2011.
Office Action issued in U.S. Appl. No. 12/422,548 dated Nov. 21, 2012.
Office Action issued in U.S. Appl. No. 12/422,548 dated Mar. 28, 2013.
Office Action issued in U.S. Appl. No. 12/422,548 dated Aug. 28, 2013.
Office Action issued in U.S. Appl. No. 12/422,548 dated Jun. 26, 2014.
Office Action issued in U.S. Appl. No. 11/919,113 dated Jul. 26, 2011.
Office Action issued in U.S. Appl. No. 11/919,113 dated Sep. 26, 2011.
Office Action issued in U.S. Appl. No. 11/919,113 dated Mar. 6, 2012.
Office Action issued in U.S. Appl. No. 11/919,113 dated Jun. 12, 2012.
Office Action issued in U.S. Appl. No. 11/919,113 dated Feb. 5, 2013.
Office Action issued in U.S. Appl. No. 11/919,184 dated Oct. 27, 2011.
Office Action issued in U.S. Appl. No. 11/919,184 dated Jan. 6, 2012.
Office Action issued in U.S. Appl. No. 11/919,184 dated Sep. 4, 2012.
Office Action issued in U.S. Appl. No. 11/919,184 dated Dec. 12, 2012.
Office Action issued in U.S. Appl. No. 11/919,183 dated Oct. 27, 2011.
Office Action issued in U.S. Appl. No. 11/919,183 dated Jan. 4, 2012.
Office Action issued in U.S. Appl. No. 11/886,708 dated Jun. 30, 2010.
Office Action issued in U.S. Appl. No. 11/886,708 dated Oct. 13, 2010.
Office Action issued in U.S. Appl. No. 11/886,708 dated Apr. 26, 2011.
Office Action issued in U.S. Appl. No. 11/886,708 dated Mar. 29, 2012.
Office Action issued in U.S. Appl. No. 11/886,708 dated Jan. 16, 2013.
Office Action issued in U.S. Appl. No. 13/711,121 dated Sep. 30, 2013.
Office Action issued in U.S. Appl. No. 13/711,171 dated Jun. 11, 2013.
Office Action issued in U.S. Appl. No. 13/711,171 dated Apr. 11, 2014.
U.S. Appl. No. 11/886,708, filed Sep. 19, 2007.
U.S. Appl. No. 13/711,121, filed Dec. 11, 2012.
U.S. Appl. No. 13/711,171, filed Dec. 11, 2012.
U.S. Appl. No. 13/895,820, filed May 16, 2013.
U.S. Appl. No. 13/895,884, filed May 16, 2013.
U.S. Appl. No. 14/036,824, filed Sep. 25, 2013.

* cited by examiner

TIRE NOISE REDUCTION DEVICE

BACKGROUND OF THE INVENTION

1. Field of the Invention

The present invention relates to a tire noise reduction device. More specifically, the present invention relates to a tire noise reduction device including a noise absorbing member having an improved performance of resistance to embrittlement under low temperature, the noise absorbing member made of a porous material and arranged on the inner circumferential surface of a tire.

2. Description of the Prior Art

A cause of noises made by a pneumatic tire is cavity resonance sound which occurs due to vibration of the air filled in the tire. The cavity resonance sound occurs when the air filled in the tire vibrates due to vibration caused in a tread part of the tire. This is a result of deformation which occurs in the tread part each time the tread part repeatedly contacts the road surface during rotation of the tire.

As a method of reducing noises which occur due to such a cavity resonance phenomenon, Japanese Patent Application Kokai Publication No. 2004-291855 discloses a tire noise reduction device including an annular noise absorbing member which is made of a porous material and is arranged on the inner circumferential surface of a tire. However, the noise absorbing member which is made of a porous material and is arranged on the inner circumferential surface of the tire has the following problem: the noise absorbing member is damaged by friction of the noise absorbing member with the inner surface of the tire, which is generated by repeated compressive deformation of the tire when the tire is rotating. As in the embodiment described in FIG. 6 of Japanese Patent Application Kokai Publication No. 2004-291855, such a noise absorbing member can be effectively prevented from being damaged by covering the outer circumferential surface of the annular noise absorbing member with a thermoplastic resin film as a protective layer.

Nevertheless, when such an approach is employed in a tire used in a cold weather area, another problem arises. Since the tread in contact with iced and snowed road surfaces is placed under low temperature conditions, the thermoplastic resin film in contact with the inner surface of the tire becomes brittle and broken, and thus stops functioning as the protective layer.

SUMMARY OF THE INVENTION

An object of the present invention is to provide a tire noise reduction device capable of preventing a noise absorbing member made of a porous material from being damaged even if a tire including the noise reduction device is used in a cold weather area.

A tire noise reduction device according to the present invention made to attain the above-described object is a tire noise reduction device including an annular noise absorbing member which is made of a porous material is arranged on the inner circumferential surface of a tire. As a protective layer, a film made of a thermoplastic elastomer composition obtained by dispersing an elastomer in a thermoplastic resin is placed on the outer circumferential surface of the annular noise absorbing member.

The present invention is capable of preventing the noise absorbing member from being damaged due to friction between the noise absorbing member and a tread part of the tire. This is because, as the protective layer, the film made of the thermoplastic elastomer composition obtained by dispersing the elastomer in the thermoplastic resin is placed on the outer circumferential surface of the annular noise absorbing member in the tire noise reduction device. The device includes the annular noise absorbing member which is made of the porous material, and which is arranged on the inner circumferential surface of the tire. In addition, the present invention does not allow the noise absorbing member to reduce its protective effect even when a tire in which the tire noise reduction device is installed is used in a cold weather area. This is because the glass transition temperature of the thermoplastic elastomer composition is extremely lower than that of the thermoplastic resin so that the protective layer does not become brittle and broken.

DESCRIPTION OF THE PREFERRED EMBODIMENTS

Detailed descriptions will be provided for tire noise reduction devices according to the present invention by referring to the attached drawings.

Figure 1:
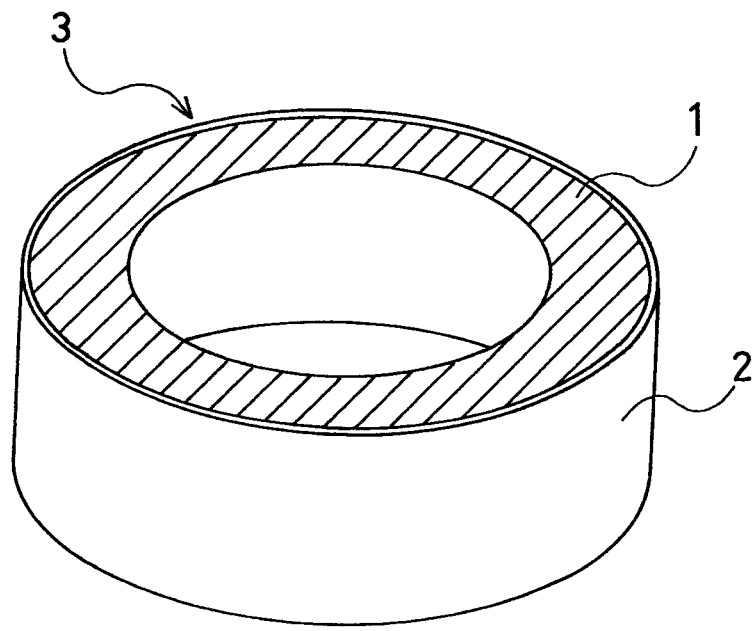
FIG. 1 is a schematic perspective view showing a tire noise reduction device according to an embodiment of the present invention.

FIG. 1 shows a tire noise reduction device according to an embodiment of the present invention. A tire noise reduction device 3 shown in FIG. 1 includes: an annular noise absorbing member 1 made of a porous material; and a protective layer 2 covering the outer circumferential surface of the annular noise absorbing member 1. The protective layer 2 includes a film molded from a thermoplastic elastomer composition obtained by dispersing an elastomer in a thermoplastic resin.

Figure 4:
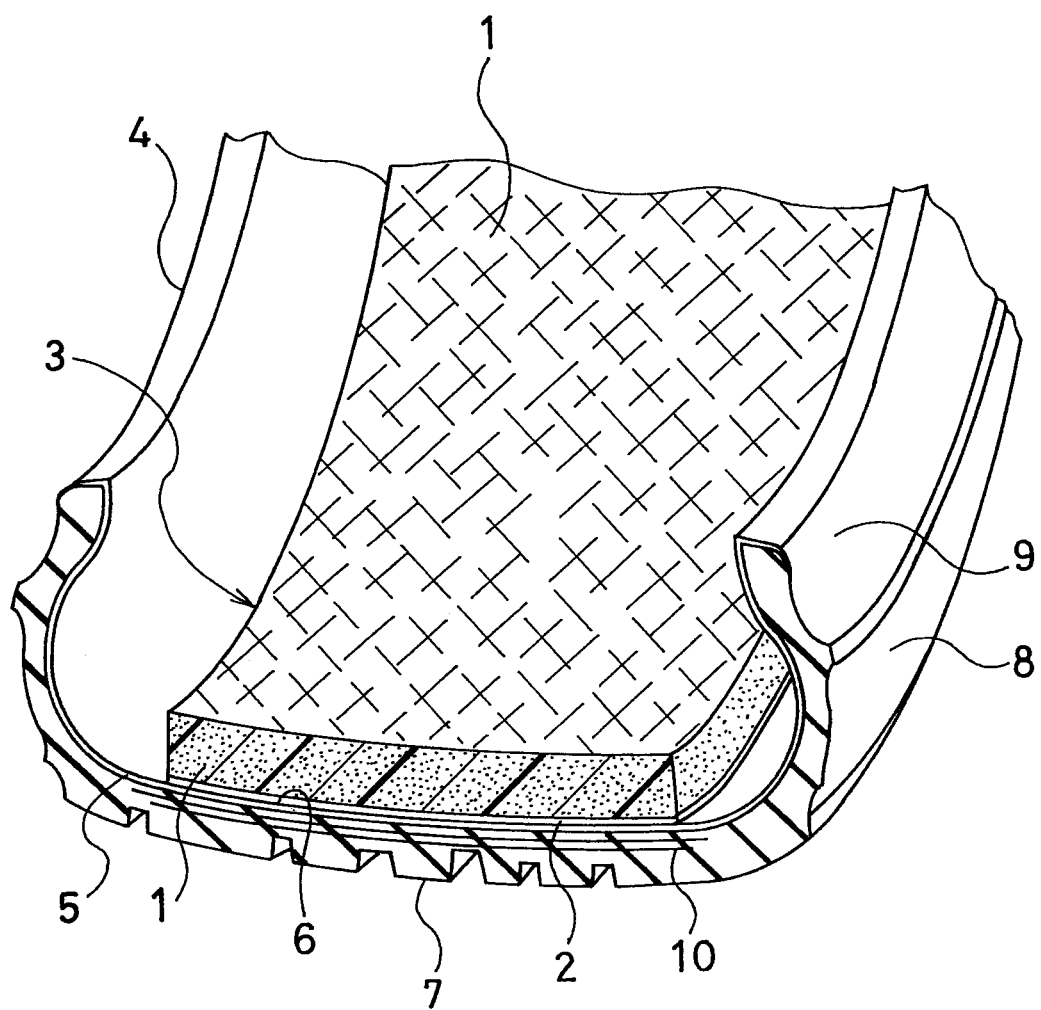
FIG. 4 is a partially-cutaway cross-sectional view of a chief part of a tire in which the tire noise reduction device as shown in FIG. 1 is installed.

As shown in FIG. 4, the tire noise reduction device 3 configured in the above-described manner is inserted inside a pneumatic tire 4, and is placed along an inner circumferential surface 6 of a tread part 7. The pneumatic tire 4 is formed to extend into a sidewall part 8 and a bead part 9 in each of the left and right sides of the tread part 7. Multiple belt layers 10 are placed inside the tread part 7. In addition, an inner liner layer 5 is adhered to the inner surface of the tire.

In the tire noise reduction device 3 according to the present invention, the protective layer 2 prevents the noise absorbing member 1 from being damaged due to friction between the noise absorbing member 1 and the inner circumferential surface of the tread part 7. This is because, as described above, the protective layer 2 is placed on the outer circumferential surface of the noise absorbing member 1. In addition, the thermoplastic elastomer composition constituting the protective layer 2 is capable of contributing to the protection of the noise absorbing member 1 even when the protective layer 2 is used in a cold weather area. This is because the glass transition temperature of the thermoplastic elastomer composition is extremely lower than that of any thermoplastic resin so that, when used in the cold weather area, the protective layer 2 does not become brittle and broken.

Figure 2:
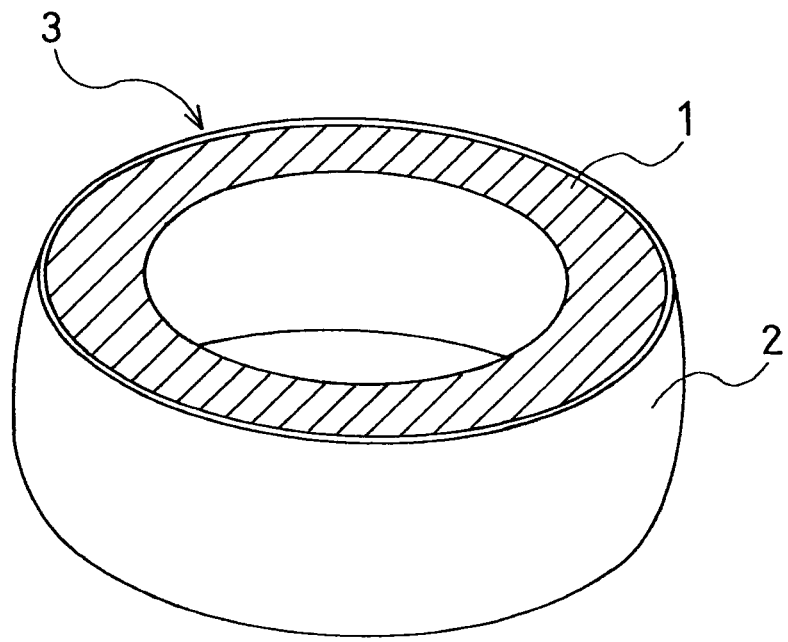
FIG. 2 is a schematic perspective view showing a tire noise reduction device according to another embodiment of the present invention.

In the present invention, the protective layer 2 may be obtained by molding the thermoplastic elastomer composition into a cylindrical shape, or obtained by forming a sheet-shaped film made of the thermoplastic elastomer composition into a cylindrical shape by connecting together the two end portions of the sheet-shaped film. Otherwise, like a protective layer according to an embodiment shown in FIG. 2, the protective layer 2 may be formed with a profile which makes the protective layer 2 bulge outward like a barrel, and in which the distance between any two diametrically-opposite points on the protective layer's portion corresponding to the equatorial portion of the tire is a maximum diameter of the protective layer 2. When the protective layer 2 is formed with the profile which makes the protective layer 2 bulge outward like a barrel, it is easier to fit the protective layer 2 to the inner circumferential surface 6 of the pneumatic tire 4.

It is desirable that the maximum outer circumferential length of the protective layer 2 should be set at 95.5% to 99.8% of the maximum inner circumferential length of the tread part 7 of the tire. When the protective layer 2 is configured with this maximum outer circumferential length, it is possible to further increase the durability of the tire noise reduction device 3. This is because such a configuration decreases an excessive compressive force which the noise absorbing member 1 receives.

It is desirable that the annular noise absorbing member 1 should be constituted of an annular body formed endlessly in the circumferential direction of the tire. Such an annular body may be obtained by curving a plate-shaped noise absorbing member into a cylindrical shape, and thereafter by connecting together the two end portions of the plate-shaped noise absorbing member. Otherwise, the annular noise absorbing member 1 may be produced as an annular injection-molded body. Otherwise, the annular noise absorbing member 1 may be punched out from a block-shaped material into a cylindrical shape. The latter is better in durability than the former, because the latter is seamless.

It is desirable that the width of the noise absorbing member 1 should be set at 50% to 100% of the maximum width of the belt layers 10 of the tire. It is more desirable that the width of the noise absorbing member 1 should be set at 70% to 100% of the maximum width of the belt layers 10 of the tire.

It is desirable that the thickness of the noise absorbing member 1 should be set at 5 mm to 50 mm. It is more desirable that the thickness of the noise absorbing member 1 should be set at 10 mm to 30 mm. In addition, the noise absorbing member 1 does not have to be even in thickness in the width direction of the tire.

Figure 3:
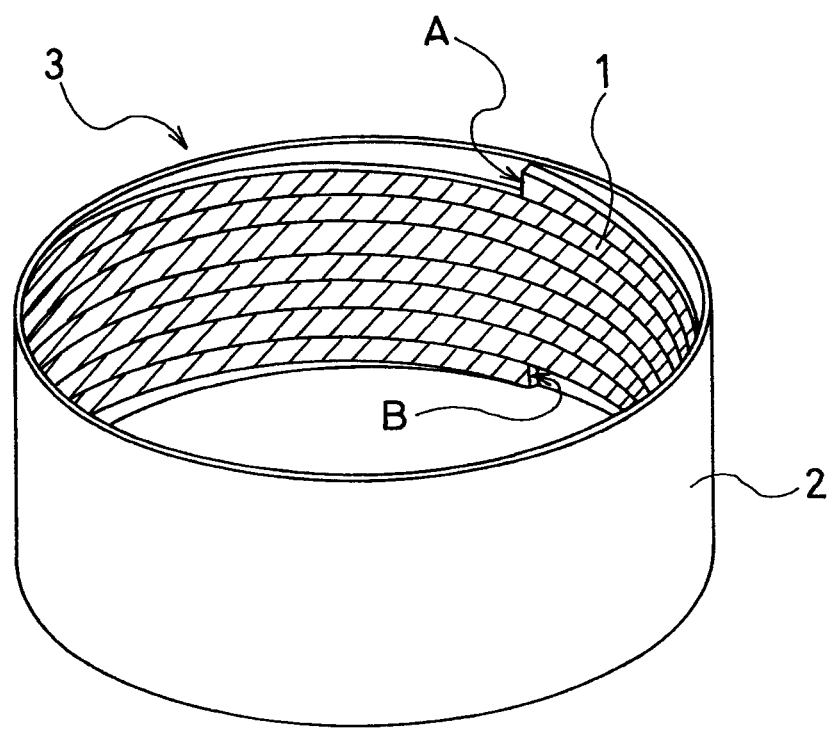
FIG. 3 is a schematic perspective view showing a tire noise reduction device according to yet another embodiment of the present invention.

Like a noise absorbing member according to an embodiment shown in FIG. 3, the annular noise absorbing member may be formed as an annular body by helically winding a belt-shaped porous material in the circumferential direction of the tire multiple times. This annular body can be formed into a shape which meets a profile shape of the inner circumferential surface of the tire depending on the size of the tire regardless of the inner diameter of the tire. For this reason, the annular body is better in cost-effectiveness and processability. In a case where the annular body is formed by helically winding the belt-shaped porous material multiple times, it is desirable that the two end portions A, B of the belt-shaped porous material constituting the completed annular body in the longitudinal direction of the belt-shaped porous material should be placed at a facing angle in a range of zero degrees to 15 degrees, and more desirably in a range of zero degrees to 10 degrees. When the two end portions A, B are placed in this manner, it is possible to suppress mass unbalance of the annular body. Furthermore, it is desirable that the width of the belt-shaped noise absorbing material should be set at 10 mm to 60 mm. It is more desirable that the width of the belt-shaped noise absorbing material should be set at 15 mm to 45 mm. Moreover, it is desirable that the thickness of the belt-shaped noise absorbing material should be set at 10 mm to 30 mm.

In addition, in a case where, as shown in FIG. 3, the belt-shaped porous material is formed into a cylinder-shaped noise absorbing member 1 by helically winding the belt-shaped porous material in the circumferential direction of the tire multiple times, it is desirable that the interval between an side edge of a portion of the belt-shaped porous material and a corresponding side edge of another portion of the belt-shaped porous material which is adjacently placed in the width direction of the belt-shaped porous material should be set at 1 mm to 50 mm. It is more desirable that the interval should be set at 2 to 30 mm. When any two adjacent portions of the belt-shaped porous material are placed with such an interval between their corresponding side edges, it is possible to prevent each two adjacently-placed portions of the belt-shaped porous material from being damaged due to friction which would otherwise occur between the adjacently-placed portions thereof through their mutual contact.

As a pneumatic tire in which any one of the tire noise reduction devices according to the present invention is installed, it is desirable that the inner liner layer 5 should be constituted of a film layer made of a thermoplastic resin or a thermoplastic elastomer composition obtained by dispersing an elastomer in a thermoplastic resin. It is more desirable that matrix resins respectively of the inner liner layer 5 and the protective layer 2 for the noise absorbing member should be formed of the same material. When the matrix resins are formed of the same material, static electricity is less likely to occur due to friction between the inner liner layer 5 and the protective layer 2.

In the present invention, no specific restriction is imposed on the porous material of which the noise absorbing member is made, as long as the porous material is a resin including open cells. It is desirable that polyurethane foam should be used as the porous material. In addition, it is desirable that, for example, a polyamide resin, a polyester resin or a polyvinyl resin should be used as the thermoplastic resin contained in the thermoplastic elastomer composition of which the protective layer is formed. Examples of the polyamide resin include nylon 6 (N6), nylon 66 (N66), nylon 46 (N46), nylon 11 (N11), nylon 12 (N12), nylon 610 (N610), nylon 612 (N612) nylon 6/66 copolymer (N6/66), nylon 6/66/610 copolymer (N6/66/610), nylon MXD 6 (MXD6) and nylon 6T. Examples of the polyether resin include polybutylene terephthalate (PBT) polyethylene terephthalate (PET) and polybutylene naphthalate (PBN). Examples of the polyvinyl resin include polyvinyl alcohol (PVA) and polyvinyl alcohol/ethylene copolymer (EVOH).

In addition, it is desirable that, for example, an olefin rubber or a halogen-containing rubber should be used as the elastomer which is dispersed in the thermoplastic resin. Examples of the olefin rubber include ethylene propylene rubber (EPDM (ethylene propylene dien monomer), EPM (ethylene propylene monomer)), maleated ethylene propylene rubber (M-EPM) and butyl rubber (IIR (isobutylene-isoprene rubber). Examples of the halogen-containing rubber include Br-IIR (brominated butyl rubber), Cl-IIR (chlorobutyl rubber) and Br-IPMS (brominated isobutylene paramethyl styrene copolymer).

In the thermoplastic elastomer composition, it is desirable that the composition ratio of the thermoplastic resin to the elastomer should be set in a range of 90:10 to 30:70 in terms of weight ratio. In this respect, the thermoplastic resin is the matrix composition of the thermoplastic elastomer composition, and the elastomer as dispersed exists in the thermoplastic elastomer composition.

This composition is extremely good in performance of resistance to embrittlement under low temperature. The tire noise reduction device which is extremely good in low-temperature durability can be formed of this composition. No specific restriction is imposed on how the protective layer should be formed. The protective layer can be formed as follows. To begin with, the thermoplastic resin constituting the thermoplastic elastomer composition is formed into a sheet shape such as a film shape. Subsequently, the sheet-shaped thermoplastic resin is adhered to the outer circumference of the annular noise absorbing member by use of an adhesive resin such as a low-melting, by use of an adhesive, or by thermal adhesion.

EXAMPLES

A thermoplastic elastomer composition made in accordance with a composition shown in Table 1 was used as a protective layer used for each of tire noise reduction devices according to the following examples 1 to 3. This thermoplastic elastomer composition was produced as follows. An elastomer and a crosslinker were mixed in a Banbury® airtight mixer at 100° C. for two minutes. Thereby, a rubber compound was produced. Subsequently, the rubber compound was processed into pellets. On the other hand, a modified polyolefin resin and a plasticizer were kneaded by use of a biaxial kneader at a maximum shear rate of $120 \, s^{-1}$ at 250° C. for three minutes. Subsequently, the resin composition thus kneaded was processed into pellets. Thereafter, the obtained pellets of the resin composition and the pellets of the rubber compound were kneaded by the biaxial kneader at 270° C. for two minutes. Afterward, the thermoplastic elastomer composition thus kneaded was processed into pellets.

By using these pellets as a material for the protective layer for the noise absorbing member, a 0.2 mm-thick film made of the thermoplastic elastomer resin composition was produced by injection molding.

As a protective layer for the noise absorbing member according to a comparative example, a 0.2 mm-thick film made of PVDC (polyvinylidene chloride) as the material for the protective layer was produced by injection molding.

TABLE 1

Composition of Thermoplastic Elastomer Composition

| rubber | Br-IPMS | 100 parts by weight |
| --- | --- | --- |
| crosslinker | zinc oxide | 0.15 parts by weight |
| | stearic acid | 0.60 parts by weight |
| | Zinc stearate | 0.30 parts by weight |
| resin | nylon 6/66 | 63 parts by weight |
| plasticizer | BBSA | 27 parts by weight |
| polyolefin | Mah-EEA | 10 parts by weight |

Note:
Br-IPMS: Exxpro MDX89-4 (Exxon Mobile Chemicals)
zinc oxide: Zinc Oxide No. 3 (Seido Chemical Industry Co., Ltd.)
stearic acid: Beads Stearic Acid (NOF Corporation)
zinc stearate: Zinc Stearate (Sakai Chemical Inductry Co., Ltd)
nylon 6/66: UBE Nylon 5033B (Ube Industries, Ltd.)
BBSA: BM-4 (Daihachi Chemical Industry Co., Ltd.)
Mah-EEA: HPRAR201 (Du Pont Mitsui Fluorochemicals)

Example 1

A plate-shaped urethane foam material was curved into an annular form, and the two end portions of the thus-curved material were connected together. Thereby, an annular noise absorbing member was produced. As the protective layer, the film made of the thermoplastic elastomer resin composition was wound around the outer circumferential surface of the noise absorbing member. Subsequently, the two end portions of the protective layer and the two end portions of the noise absorbing member were adhered together by use of an adhesive, respectively. Thereby, the tire noise reduction device was produced. The maximum outer circumferential length of the protective layer was set at 99% of the maximum inner circumferential length of a test tire which will be described later.

Example 2

An integral annular body was cut out from a block-shaped urethane foam material. Thereby, a noise absorbing member was produced. As the protective layer, the film made of the thermoplastic elastomer resin composition was wound around the outer circumferential surface of the noise absorbing member. Subsequently, the two end portions of the protective layer and the two end portions of the noise absorbing member were adhered together by use of the adhesive, respectively. Thereby, the tire noise reduction device was produced. The maximum outer circumferential length of the protective layer was set at 99% of the maximum inner circumferential length of a test tire which will be described later.

Example 3

An integral annular body was cut out from a block-shaped urethane foam material. Thereby, a noise absorbing member was produced. As the protective layer, the film made of the thermoplastic elastomer resin composition was wound around the outer circumferential surface of the noise absorbing member. Subsequently, the two end portions of the protective layer and the two end portions of the noise absorbing member were adhered together by use of the adhesive, respectively. Thereby, the tire noise reduction device was produced. The maximum outer circumferential length of the protective layer was set at 98% of the maximum inner circumferential length of a test tire which will be described later.

Comparative Example

A belt-shaped urethane foam material was curved into an annular form, and the two end portions of the thus-curved material were connected together. Thereby, an annular noise absorbing member was produced. As the protective layer, a sheet-shaped matter made of PVDC described above was wound around the outer circumferential surface of the noise absorbing member. Subsequently, the two end portions of the protective layer and the two end portions of the noise absorbing member were adhered together by use of the adhesive, respectively. Thereby, the tire noise reduction device was produced. The maximum outer circumferential length of the protective layer was set at 100% of the maximum inner circumferential length of a test tire which will be described later.

Each of the obtained tire noise reduction devices according to Example 1 to 3 and Comparative Example was installed in a pneumatic tire with a tire size 215/60R16, which was mounted on a rim with an air pressure of 210 kPa. Subsequently, the durability of each tire was evaluated through the below-described durability test.

As a result, the distance that the pneumatic tire provided with the tire noise reduction device according to Example 1 traveled until the protective layer broke was 36,000 km. The distance that the pneumatic tire provided with the tire noise reduction device according to Example 2 traveled until the protective layer broke was 48,000 km. The distance that the pneumatic tire provided with the tire noise reduction device according to Example 3 traveled until the protective layer broke was 54,000 km. The distance that the pneumatic tire provided with the tire noise reduction device according to Comparative Example traveled until the protective layer broke was 6,000 km. The tires including the respective tire noise reduction devices according to Examples 1 to 3 exhibited a far better durability than the tire including the tire noise reduction device according to Comparative Example.

[Durability Test]

Each pneumatic tire was caused to run at a speed of 80 km/h on a drum with a diameter of 1707 mm with a 4.5-kN load being imposed on the tire at an ambient temperature of −20° C. Each time each tire completed travelling 6,000 km, the pneumatic tire was visibly observed in terms of whether or not the noise absorbing member provided to the pneumatic tire suffered crack/damage. The test of each pneumatic tire was terminated when the pneumatic tire was observed as being cracked or damaged. For each pneumatic tire, the distance that the pneumatic tire traveled before the test was terminated was obtained and evaluated.

What is claimed is:

1. A pneumatic tire comprising:
an inner liner layer adhered to an inner circumferential surface of the tire; and
a tire noise reduction device including:
an annular noise absorbing member which is made of a porous material; and
a protective layer for preventing the annular noise absorbing member from being damaged due to friction between the annular noise absorbing member and the inner liner layer, wherein the protective layer is made of a thermoplastic elastomer composition obtained by dispersing an elastomer in a thermoplastic resin and arranged on an outer circumferential surface of the annular noise absorbing member, wherein the protective layer covers the entire outer circumferential surface of the noise reduction device, is commensurate in width with the noise absorbing member, and lies between the inner liner layer and the noise absorbing member, wherein a maximum outer circumferential length of the protective layer is set at 95.5% to 99.8% of a maximum inner circumferential length of a tread part of a tire in which the tire noise reduction device is installed,
wherein the thermoplastic resin of the protective layer and a matrix resin of the inner liner layer are formed of the same material, thereby making static electricity, due to friction between the protective layer and the inner liner layer, less likely to occur,
wherein the protective layer is adhered to an outer circumferential surface of the annular noise absorbing member, and
wherein the tire noise reduction device is merely placed along the inner liner layer, without being bonded to the inner liner layer.

2. The tire according to claim 1, wherein:
the noise absorbing member is constituted of an annular body formed endlessly in a circumferential direction of the tire.

3. The tire according to claim 1, wherein:
the noise absorbing member is constituted of an annular body having a helical structure formed by helically winding a belt-shaped porous material in a circumferential direction of the tire a plurality of times.

4. The tire according to claim 3, wherein:
two end portions of the belt-shaped porous material in its longitudinal direction are placed to have a facing angle in a range of 0 degrees to 15 degrees with respect to a center axis around which a tire rotates.

5. The tire according to claim 3, wherein:
an interval between side edges of the belt-shaped porous material which are adjacent to each other in a width direction of the belt-shaped porous material is set in a range of 1 mm to 50 mm.

6. The tire according to claim 1, wherein:
the inner liner layer of the tire is made of any one of a thermoplastic resin and a thermoplastic elastomer composition obtained by dispersing an elastomer in a thermoplastic resin.

7. The tire according to claim 3, wherein:
an interval between side edges of the belt-shaped porous material which are adjacent to each other in a width direction of the belt-shaped porous material is set in a range of 2 mm to 30 mm.

8. The tire according to claim 1, wherein:
two end portions of the belt-shaped porous material in its longitudinal direction are placed to have a facing angle in a range of 0 degrees to 10 degrees with respect to a center axis around which a tire rotates.

9. The tire according to claim 3, wherein:
the width of the belt-shaped noise absorbing material is set at 10 mm to 60 mm.

10. The tire according to claim 3, wherein:
the width of the belt-shaped noise absorbing material is set at 15 mm to 45 mm.

11. The tire according to claim 3, wherein:
the thickness of the belt-shaped noise absorbing material is between 10 mm to 30 mm.

12. The tire according to claim 3, wherein:
the width of the noise absorbing member is set at 50% to 100% of the maximum width of a belt layer of the tire.

13. The tire according to claim 1, wherein:
the width of the noise absorbing member is set at 70% to 100% of the maximum width of a belt layer of the tire.

14. The tire according to claim 1, further comprising:
the elastomer which is dispersed in the thermoplastic resin is made of olefin rubber or a halogen-containing rubber.

15. The tire according to claim 1, further comprising:
the composition ratio of the thermoplastic resin to the elastomer is set in the range of 90:10 to 30:70 in terms of weight ratio.

16. The tire according to claim 1, wherein the protective layer is sheet-shaped.

17. The tire according to claim 1, wherein an outer circumferential surface of the protective layer bulges outwardly in the radial direction because the annular noise absorbing member is not of a uniform diameter along the width thereof.

* * * * *